(No Model.)

M. I. WINTERS.
VEHICLE WHEEL.

No. 287,075. Patented Oct. 23, 1883.

Witnesses:
H. H. Hamilton
Amos Knight

Inventor:
Milton I. Winters
R. S. & A. P. Lacey
Attorneys

UNITED STATES PATENT OFFICE.

MILTON I. WINTERS, OF HAMLIN, EATON COUNTY, MICHIGAN.

VEHICLE-WHEEL.

SPECIFICATION forming part of Letters Patent No. 287,075, dated October 23, 1883.

Application filed January 22, 1883. (No model.)

*To all whom it may concern:*

Be it known that I, MILTON I. WINTERS, of the township of Hamlin, county of Eaton, and State of Michigan, have invented a new and useful Improvement in Vehicle-Wheels, of which the following is a specification.

This invention relates to improvements in vehicle-wheels, whereby the fellies are prevented from contracting or expanding under the action of cold, heat, or dampness.

The invention consists in having one or more grooves or channels formed in the outer face or perimeter of the fellies or wheel, the channel or channels covered and closed by the tire thus forming a reservoir or reservoirs for holding oil, and a nut or bolt inserted in the felly and adapted to be turned so as to close or open the inlet-hole in the tire, all of which will be hereinafter fully described.

Figure 1:
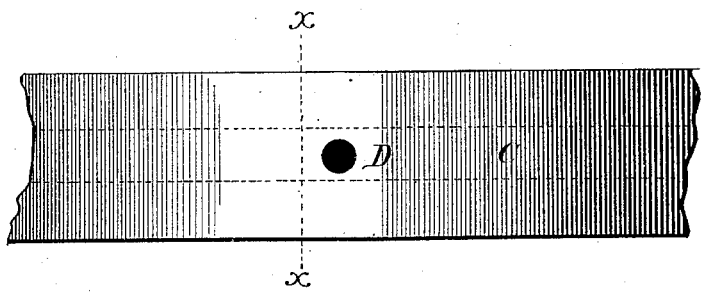
Figure 2:
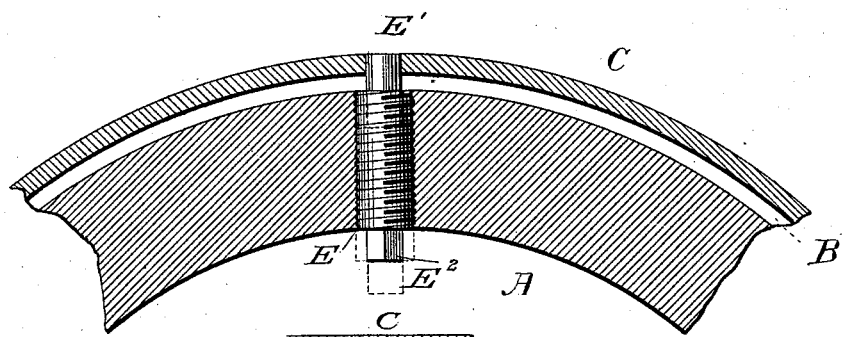
Figure 3:
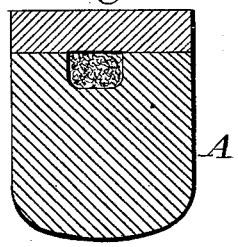

In the drawings, Figure 1 is a plan of a portion of a tire, showing the inlet-hole through which the oil is poured. Fig. 2 is a circumferential section of a portion of a felly and tire, showing the oil-channel in the felly and the bolt for closing the oil-inlet in the tire; and Fig. 3 is a cross-section on line $x\,x$, Fig. 1.

A is the felly or rim of the wheel.

B is the circumferential channel or groove formed in the outer face or perimeter of the wheel.

C is the tire placed upon the wheel, and so as to cover and close the outer or open side of the channel B and form a closed reservoir, into which the oil is poured. The tire is perforated by an opening, D, through which the oil is poured into the channel. If more than one channel B is made in the rim of the wheel, additional oil-inlet openings may be provided, or openings may be made in the felly from one channel to the other, through which the oil will run, and thus dispense with additional inlet-openings through the tire.

E is the plug or bolt for closing the inlet-opening D. It is provided with a stem, E', adapted to enter and fit snugly the said opening. The plug is threaded, as shown, and is inserted in a suitable opening formed radially through the felly and immediately opposite the opening D. The inner end of the plug is formed with a head or extension, $E^2$, adapted to be taken hold of by a wrench or other suitable instrument, whereby it may be turned as desired.

In wheels having their rims composed of a series of fellies the channels B would preferably be formed not continuous, but would be limited to each felly, and a small partition would separate the channel in one felly from the end of the channel of the next adjacent felly. This would be done in order to provide against joints not close-fitting between the ends of the said fellies. In such construction an opening, D, and a plug, E, would have to be provided for each felly.

A filling or packing of waste or any suitable textile material adapted to hold oil may be used to fill the channel or channels, to take up the oil when the latter is first poured into the reservoir.

In addition to the grooves or channels hereinbefore described, holes may be bored, especially between the joints or abutting ends of the fellies, which will have a double purpose—namely, of keeping the joints solid and enlarging the capacity to store oil for saturating purposes.

By opening the hole D oil may be poured into and fill the circumferential reservoir.

The tire C, when the wheel is first made, is snugly set, and covers the oil-channels and prevents the oil from running out between it and the face of the rim. The tire is made of the ordinary tire-iron, and when set has a plain or flat face in contact with the face of the wheel.

The packing or filling material hereinbefore described is a valuable addition in the matter of the preservation of the oil and wheel. It surrounds the wheel, and being of textile fabric, it will hold the oil more evenly distributed, and at the same time will not retain the oil against the absorption by the wood fiber of the felly. When the vehicle is standing and the reservoir is filled with oil alone, the latter will drop to the lower parts of said reservoir, and as the absorption progresses the upper portions of the reservoir will become empty. The use of a textile oil-holding material equally filling all parts of the channel will retain the oil equally distributed around the rim, whether the vehicle be in motion or at rest.

Having thus described my invention, what I claim, and desire to secure by Letters Patent, is—

In a vehicle-wheel, the combination, substantially as hereinbefore set forth, of the wheel-rim having one or more circumferential grooves or channels formed in its outer face, and a radial threaded opening cut through from the inner side thereof, and communicating with one of the circumferential channels, the tire shrunk upon the rim and closing the outer side of the channel, and having an inlet-opening arranged opposite the threaded opening in the wheel-rim, and a threaded plug adapted to close and turn in the threaded opening in the wheel-rim, and having an extension or stem adapted to enter the inner end of and close the inlet-opening in the tire, as set forth.

MILTON I. WINTERS.

Witnesses:
JAMES B. BRADLEY,
ZENO T. MILLER.